US008170200B1

United States Patent
Chu et al.

(10) Patent No.: US 8,170,200 B1
(45) Date of Patent: May 1, 2012

(54) METHOD AND APPARATUS FOR PERCUSSIVE NOISE REDUCTION IN A CONFERENCE

(75) Inventors: Peter Chu, Lexington, MA (US); Jinwei Feng, Woburn, MA (US)

(73) Assignee: Polycom, Inc., Pleasanton, CA (US)

( * ) Notice: Subject to any disclaimer, the term of this patent is extended or adjusted under 35 U.S.C. 154(b) by 1419 days.

(21) Appl. No.: 11/684,689

(22) Filed: Mar. 12, 2007

(51) Int. Cl.
*H04M 9/08* (2006.01)

(52) U.S. Cl. .................. 379/406.12; 381/94.3

(58) Field of Classification Search .............. 379/93.21, 379/158, 202, 202.01, 406.01–406.16, 416; 381/13, 71.1, 71.14, 73.1, 94.1, 317, 94.2, 381/94.3, 71

See application file for complete search history.

(56) References Cited

U.S. PATENT DOCUMENTS

| | | | | |
|---|---|---|---|---|
| 5,825,754 A | * | 10/1998 | Williams | 370/290 |
| 7,649,988 B2 | * | 1/2010 | Suppappola et al. | 379/406.03 |
| 2006/0188104 A1 | * | 8/2006 | De Poortere | 381/57 |
| 2007/0053528 A1 | * | 3/2007 | Kim et al. | 381/107 |

* cited by examiner

*Primary Examiner* — Simon Sing
*Assistant Examiner* — Akelaw Teshale
(74) *Attorney, Agent, or Firm* — Wong, Cabello, Lutsch, Rutherford & Brucculeri, LLP

(57) ABSTRACT

A conferencing unit reduces or eliminates percussive noise in audio that it outputs to a far-end. The unit filters near-end audio into a plurality of bands and calculates instantaneous energies for each band. The energies in first and second ranges of the bands are summed, and a difference between the two sums is compared to a threshold value to determine whether speech is present in the near-end audio received. The first range is preferably a mid-band range of frequencies of 300 to 600-Hz, while the second range is preferably an outer-band range of 100-Hz to 300-Hz and 600-Hz to 14-kHz. Based on the determination, the conferencing unit adjusts an output level of the near-end audio to reduce or eliminate any percussive noise in output audio while there is not a substantial amount of speech in the near-end audio.

31 Claims, 2 Drawing Sheets

METHOD AND APPARATUS FOR PERCUSSIVE NOISE REDUCTION IN A CONFERENCE

FIELD OF THE DISCLOSURE

The subject matter of the present disclosure relates to a method and apparatus for reducing percussive noise that may occur during a conference.

BACKGROUND OF THE DISCLOSURE

Various noises may occur during a telephone conference or a video conference. Some of the noises may be impulsive noises, such as ticks or pops having very short duration. Other noises may be constant noises, such as the sound from an airconditioning unit. Conference participants may also create various percusive noises by typing on a computer keyboard, eating, shuffling papers, whispering, tapping a table with a pen, or the like. Like the other forms of noise, the percusive noises can be picked up by the conferencing equipment and sent to far end participants who may find the noises distracting or disruptive. However, the percusive noises are different than some of the other forms of noise, such as constant noises, that may occur during a conference because of the frequency range where percussive noises are in relation to the frequency range for speech. Noise reduction techniques known in the art are generally capable of handling constant noises during a conference. However, current noise reduction techniques are not well suited to handle percussive noises. Therefore, a need exits for a method and apparatus for reducing percussive noises in a conference.

SUMMARY OF THE DISCLOSURE

A conferencing unit reduces or eliminates percussive noise that it outputs to a far-end. When receiving near-end audio from a microphone, the unit filters the near-end audio into a plurality of bands and thresholds the instantaneous energy relative to background noise energy for each band. The thresholded energies in a first range of bands are summed, as are the thresholded energies in a second range of bands. The first range is preferably 300 to 600-Hz, while the second range is preferably 100 to 300-Hz and 600-Hz to 14-kHz. Using a calculation, these two sums are compared to a threshold value to determine whether speech is present in the near-end audio received. Based on the determination, the conferencing unit adjusts an output level of the near-end audio to reduce or eliminate any percussive noise in audio that it outputs to far-end units. Preferably, the threshold value used in the comparison depends on whether there is far-end audio present in the near-end audio currently being received by the unit for processing.

The foregoing summary is not intended to summarize each potential embodiment or every aspect of the present disclosure.

DETAILED DESCRIPTION

Figure 1:
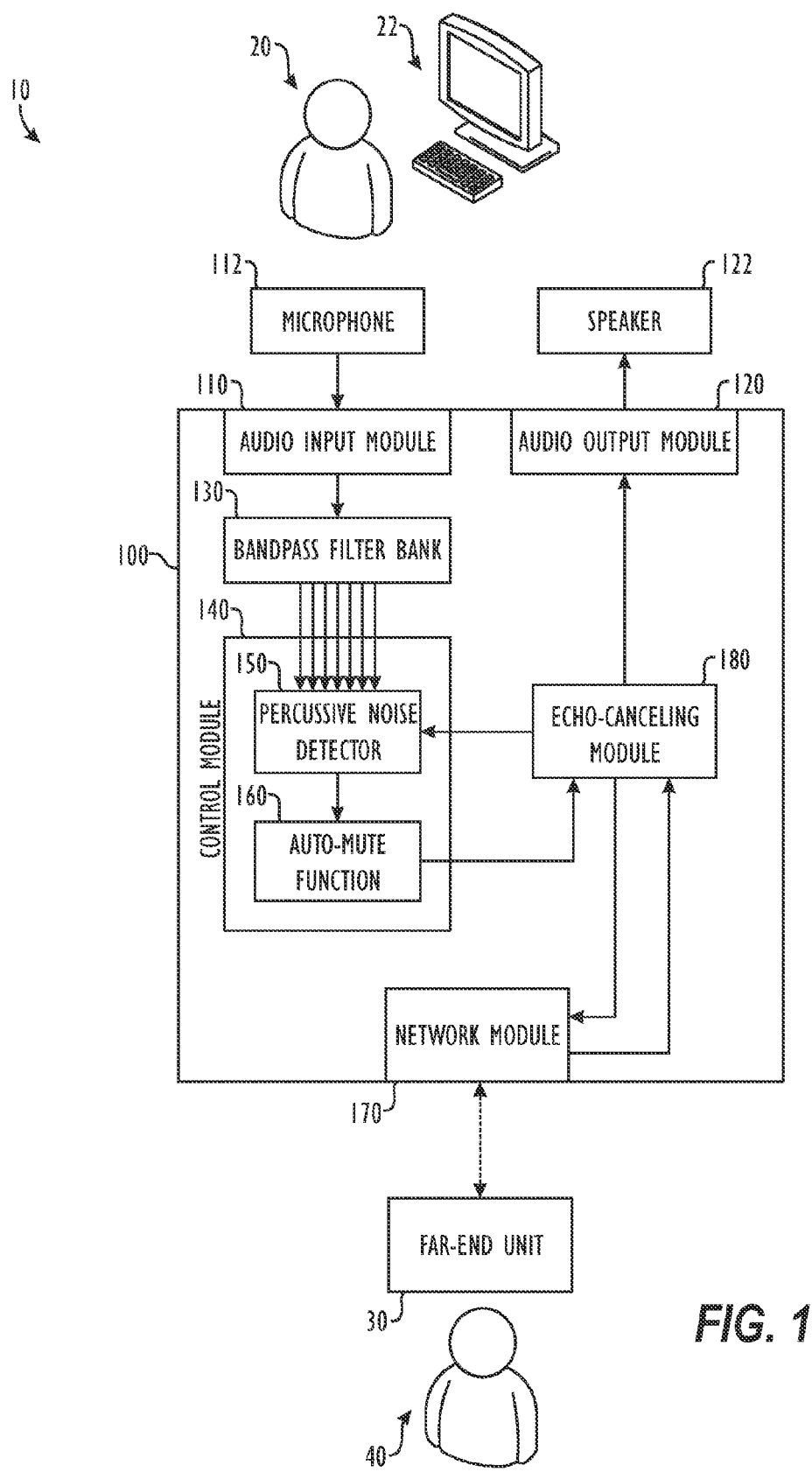
FIG. 1 illustrates one embodiment of a conferencing system according to certain teachings of the present disclosure.

Referring to FIG. 1, a conferencing system 10 is illustrated. The conferencing system 10 can be a telephone conferencing system, a videoconferencing system, a desktop conferencing system, or other type known in the art. During the conference, a near-end participant 20 may speak from time to time. All the while, an audio input module 110 of a near-end conferencing unit 100 receives near-end audio from a microphone 112. The unit 100 processes the near-end audio and sends output audio via a network interface 170 to one or more far-end conferencing units 30 where a far-end participant 40 can hear the output audio. Likewise, the network interface 170 receives far-end audio from the far-end unit 30. The conferencing unit 100 processes the far-end audio and sends it to a speaker 122 via an audio output module 120 for the near-end participant 20 to hear.

In addition to speaking, some form of percussive noise, such as typing sounds on a keyboard of a computer 22, may be generated during the conference. If the percussive noise is sent as is to the far-end unit 30, the far-end participant 40 may find the it disruptive or distracting. To reduce the effects of percussive noise, the conferencing unit 100 includes a percussive noise detector 150 and an auto-mute function 160. These components are used in conjunction with some conventional components of the conferencing unit 100, which can be, for example, a Polycom HDX series videoconferencing unit.

The conventional components of the conferencing unit 100 include a band pass filter bank 130, a control module 140, a network interface 170, and an echo-canceling module 180. Because these conventional components are known in the art, they are not described in detail here. In general, these components 130, 140, 170, and 180 can be discrete components or can be integrated together. The filter bank 130, control module 140, and echo-cancellation module 180 can be comprised of one or more of a microcontroller, programmable Digital Signal Processor, Field Programmable Gate Array, or application-specific integrated circuit. The network interface 170 can be comprised of any conventional interfaces for teleconferencing and videoconferencing.

How the conferencing unit 100 reduces the effects of percussive noise using the percussive noise detector 150 and auto-mute function 160 will now be explained with reference to one example of a percussive noise reduction process 200 in FIG. 2. In general, this process 200 operates as a sensitive speech detector in software and hardware components of the conferencing unit 100 and detects speech while not being overly effected by percussive noises. When speech is not detected but percussive noise is present, the process 200 reduces or mutes the audio gain that it outputs to the far end. In this way, when there is no speech in the near-end audio, any irritating percussive noises can be reduced or eliminated from output audio being sent to the far-end unit 30. In one example, the percusive noise reduction process 200 may be configured to reduce non-speech, percussive noises, like typing sounds, by 14 dB or even more (for instance, a complete mute) when there is substantially no speech present in the near-end audio.

Initially in the process 200, the conferencing unit 100 recieves near-end audio from the microphone 112 (Block 205). This near-end audio may or may not include speech and percussive noises. The band pass filter bank 130 separates the received audio into a plurality of bands spanning a desired frequency range (Block 205). In one embodiment, for example, 640 bands spanning a frequency range from 0 to 16-kHz are used so that each band has a width of 25-Hz. These filtered bands will then be used in subsequent processing to reduce percusive noises, but as one skilled in the art will appreciate, there may be a number of other uses for the filtered bands from the bandpass filter bank 130.

After separating the audio into bands, the process 200 then enters a looped operation from Block 215 to Decision 240 to find the instantaneous energy for each band. Preferably, the absolute value for the instantaneous energies is used. In particular, a given band is selected (Block 205), and its absolute instantaneous energy is determined for a given time period (Block 220). Then, an estimate is calculated for the energy of the background noise in the band using known techniques for background noise estimation (Block 205). In general, the background noise estimation maintains a running minimum energy that has occurred in a previous period of time and uses this minimum as an estimate of the background noise.

An energy ratio of the instantaneous energy with respect to the background noise energy for the given band is calculated (Block 230). If the calculated energy ratio for this band is greater than a threshold (e.g., T_energy=40), then the instantaneous energy for the band is left alone. Otherwise, the value of the instantaneous energy for the band is set to zero if the ratio falls below the threshold (Block 235). Zeroing out the energy's value essentially eliminates this band from further consideration in later processing, such as when the energies are summed together as discussed below. Finally, the looped operation is repeated for another of the bands (See Decision 240).

Once the instantaneous energies have been calculated for each of the bands, the process 200 finds a first sum of the energies for bands lying within a mid-band range (Block 245) and finds a second sum of the energies for bands lying in an outer-band range (Block 250). In one embodiment, the mid-band range for the first sum encompasses a frequency range between about 300-Hz and about 600-Hz, and the outer-band range for the second sum encompasses a frequency range of about 100 to 300 Hz and about 600 Hz to 14 kHz. Experimentation has found that having these ranges is preferred, because speech may occur during a conference primarily in the preferred mid-band range and speech can be suitably differentiated from percussive noises using these ranges. However, other values for the ranges could be used. For example, the lower end of the mid-band range could be as low as 10-Hz instead of 300-Hz, or the upper end of the range could be as high as 6000-Hz instead of 600-Hz with the limits of the outer-band ranges adjusted accordingly.

The process 200 then compares the first and second sums to determine whether speech is present in the near-end audio being currently processed (Block 255). Preferably, speech is declared present if the following calculation is satisfied: [(First Sum)−A*(Second Sum)]>T_speech. Thus, speech is present if the difference of the first sum of the energies in the mid-band range less the second sum of energies in the outer-band range multiplied by a weighting factor A is greater than a threshold value, T-_speech. If speech is not substantially present in the near-end audio received, then the auto-mute function 160 is activated to either mute or reduce the gain of the audio communicated to the network interface 170 (Block 260). In this way, the auto-mute function 160 acts to eliminate or reduce the amount of near-end percussive noise that will be present in the audio output to the far-end unit 30.

In the calculation at Block 255, the value of the weighting factor A is a constant set at 16. The value used for the threshold, T_speech, however, depends on whether the loudspeaker 122 is active as determined by an input from the echo-canceling module 180 of FIG. 1. As shown in FIG. 1, the echo-canceling module 180 receives audio from the network interface 170 that has come from the far-end unit 30. Before sending the audio to the output module 120 for delivery by the speaker 122, the echo-canceling module 180 performs conventional echo-cancellation processing on the audio using techniques known in the art to reduce any echo caused by the microphone 112 receiving feedback from the speaker 122 when active.

In addition to conventional echo cancellation, the echo-canceling module 180 sends an input signal to the percussive noise detector 150 to indicate whether the loudspeaker 122 is active or not. If the input signal indicates that the loudspeaker 122 is inactive (i.e., only near-end audio is currently or primarily being received), then the percussive noise detector 150 gives the threshold, T_speech, a lower value of about 20,000 in the calculation of Block 255. If the input signal indicates that the loudspeaker 122 is active (i.e., the near-end audio received includes far-end audio output from the speaker 122), then the detector 150 gives T_speech a higher value of about 400,000.

The threshold T_speech and the weighting factor A used in the calculation of Block 255 have been experimentally found to help separate speech from potential percussive noise and to help eventually reduce or eliminate percussive noise when speech is substantially absent from the near-end audio received. Although the previous example has given only two values for the threshold T_speech, the threshold can have more than two valuations depending on the implementation and can be adjusted between several valuations in relation to the amount of echo-cancellation used and/or far-end audio signal present in the active loudspeaker 122.

Once auto-mute has been implemented as needed and the audio has been output to the network interface 170, the process 200 returns to Block 205 and repeats processing near-end audio for a new time interval, which can be every 20-ms or so. As the conference progresses, the conferencing unit 100 may mute or reduce output audio from time to time by various amounts depending on whether speech is present in the near-end audio and whether the loudspeaker 122 is active. In this way, any percussive noises that occur during the conference can be reduced or eliminated when the near-end participant 20 is not speaking. This is then intended to reduce the amount of disruptive percussive noise sent to the far-end unit 30.

Figure 2:
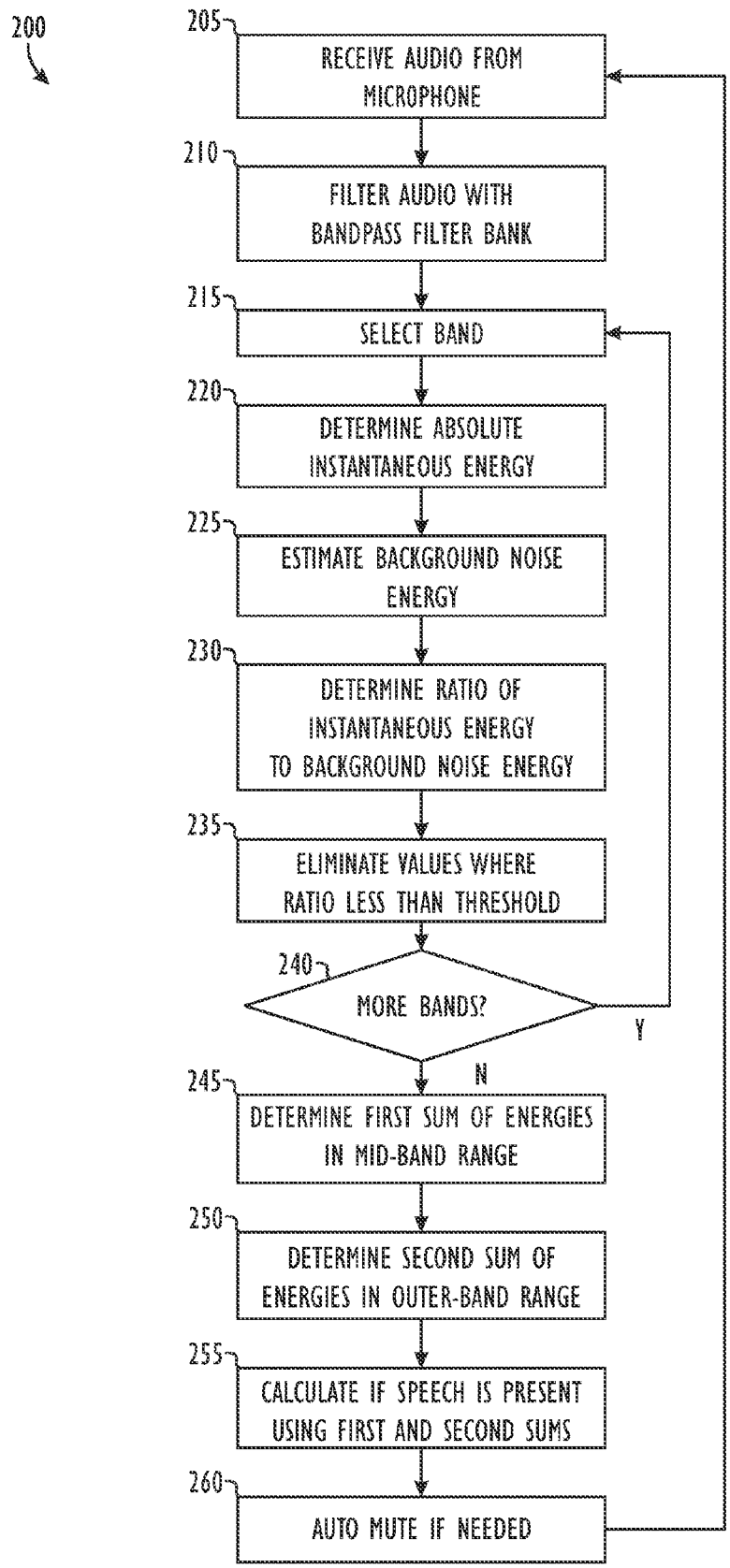
FIG. 2 illustrates one embodiment of a percussive noise reduction process for the conferencing system of FIG. 1.

The percussive noise reduction process 200 of FIG. 2 can be ultimately coded into a computer code and stored on a computer-readable media, such as a compact disk, a tape, stored in a volatile or non-volatile memory, etc. Accordingly, the percussive noise reduction process 200 of FIG. 2 can comprise instructions stored on a program storage device for causing a programmable control device to perform the process. Using an interface (e.g., RS-232 Serial Interface) between a computer and the conferencing unit 100 of FIG. 1, the conferencing unit 100 can also be programmed with coded software.

The foregoing description of preferred and other embodiments is not intended to limit or restrict the scope or applicability of the inventive concepts conceived of by the Applicant. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A machine-implementable audio handling method for a conference, comprising:
   receiving near-end audio;
   filtering the near-end audio into a plurality of bands;
   calculating an instantaneous energy for each of the bands;
   creating a first sum of the instantaneous energies for the bands in a first range of frequencies;

creating a second sum of the instantaneous energies for the bands in a second range of frequencies;
determining whether speech is present in the near-end audio by comparing the first sum to the second sum; and
adjusting an output level of the near-end audio based on the determination.

2. The method of claim 1, wherein the first range of frequencies for the first sum comprises a first frequency range from 300-Hz to 600-Hz.

3. The method of claim 2, wherein the second range of frequencies for the second sum comprises a first frequency segment from 100-Hz to 300-Hz and a second frequency segment from 600-Hz to 14-kHz.

4. The method of claim 1, further comprising:
determining a presence of far-end audio in the near-end audio received; and
using the presence of far-end audio when comparing the first and second sums of the instantaneous energies to determine whether speech is present in the near-end audio.

5. The method of claim 1, wherein creating the first and second sums of the instantaneous energies for the bands in the first and second ranges each comprise:
calculating for each of the bands an energy ratio of the instantaneous energy relative to background noise energy; and
eliminating any of those instantaneous energies from the sum that have their energy ratios below the predetermined value.

6. The method of claim 1, wherein comparing the first and second sums of the instantaneous energies comprises determining whether a difference between the first sum and the second sum is at least greater than a threshold.

7. The method of claim 6, wherein the first range comprises a mid-band range of frequencies, wherein the second range comprises an outer-band range of frequencies outside the mid-band range, and wherein determining whether speech is present in the near-end audio comprises determining that speech is present when the difference of the first sum of the energies in the mid-band range less the second sum of the energies in the outer-band range multiplied by a weighting factor is at least greater than the threshold.

8. The method of claim 6, wherein a value of the threshold depends on a presence of far-end audio in the near-end audio received.

9. The method of claim 8, wherein the threshold has a lower value if substantially only near-end audio is present in the near-end audio received and has a higher value if far-end audio is present in the near-end audio received.

10. A program storage device, readable by a programmable control device, comprising instructions stored on the program storage device for causing the programmable control device to perform an audio handling method for a conference, the method comprising:
receiving near-end audio;
filtering the near-end audio into a plurality of bands;
calculating an instantaneous energy for each of the bands;
creating a first sum of the instantaneous energies for the bands in a first range of frequencies;
creating a second sum of the instantaneous energies for the bands in a second range of frequencies;
determining whether speech is present in the near-end audio by comparing the first sum to the second sum; and
adjusting an output level of the near-end audio based on the determination.

11. The program storage device of claim 10, wherein the first range of frequencies for the first sum comprises a first frequency range from 300-Hz to 600-Hz.

12. The program storage device of claim 11, wherein the second range of frequencies for the second sum comprises a first frequency segment from 100-Hz to 300-Hz and a second frequency segment from 600-Hz to 14-kHz.

13. The program storage device of claim 10, further comprising:
determining a presence of far-end audio in the near-end audio received; and
using the presence of far-end audio when comparing the first and second sums of the instantaneous energies to determine whether speech is present in the near-end audio.

14. The program storage device of claim 10, wherein creating the first and second sums of the instantaneous energies for the bands in the first and second ranges each comprise:
calculating for each of the bands an energy ratio of the instantaneous energy relative to background noise energy; and
eliminating any of those instantaneous energies from the sum that have their energy ratios below the predetermined value.

15. The program storage device of claim 10, wherein comparing the first and second sums of the instantaneous energies comprises determining whether a difference between the first sum and the second sum is at least greater than a threshold.

16. The program storage device of claim 15, wherein the first range comprises a mid-band range of frequencies, wherein the second range comprises an outer-band range of frequencies outside the mid-band range, and wherein determining whether speech is present in the near-end audio comprises determining that speech is present when the difference of the first sum of the energies in the mid-band range less the second sum of the energies in the outer-band range multiplied by a weighting factor is at least greater than the threshold.

17. The program storage device of claim 15, wherein a value of the threshold depends on a presence of far-end audio in the near-end audio received.

18. The program storage device of claim 17, wherein the threshold has a lower value if substantially only near-end audio is present in the near-end audio received and has a higher value if far-end audio is present in the near-end audio received.

19. A conferencing unit, comprising:
an input module receiving near-end audio;
a filter bank coupled to the input module and filtering the near-end audio into a plurality of bands;
an interface for sending output audio to a far-end and for receiving far-end audio from the far-end; and
a control module in communication with the filter bank and the interface, the control module calculating an instantaneous energy for each of the bands, the control module summing in a first sum the instantaneous energies for a first range of frequencies and summing in a second sum the instantaneous energies for a second range of frequencies, the control module comparing the first and second sums to detect a presence of speech in the near-audio received and adjusting an output level of the output audio based on the detection.

20. The unit of claim 19, wherein the conferencing unit is a videoconferencing unit.

21. The unit of claim 19, further comprising:
an intermediate module coupled to the interface and to the control module, the intermediate module sending an indication to the control module that far-end audio is present in the near-end audio received.

22. The unit of claim 21, further comprising an output audio module coupled to the intermediate module for sending far-end audio to a loudspeaker, wherein the indication that far-end audio is present in the near-end audio received by the unit depends on whether the loudspeaker is active or not.

23. The unit of claim 21, wherein the control module adjusts a threshold value used in the comparison of the first and second sums in accordance with the indication from the intermediate module.

24. The unit of claim 21, wherein the intermediate module performs echo cancellation for the output audio based on a level of far-end audio received by the unit.

25. The unit of claim 19, wherein to sum the instantaneous energies for each of the first and second sums, the control module calculates for each of the bands an energy ratio of the instantaneous energy relative to background noise energy and eliminates any of those instantaneous energies from the sum that have their energy ratios below the predetermined value.

26. The unit of claim 19, wherein the first range comprises a first frequency range from 300-Hz to 600-Hz.

27. The unit of claim 26, wherein the second range comprises a first frequency segment from 100-Hz to 300-Hz and a second frequency segment from 600-Hz to 14-kHz.

28. The unit of claim 19, wherein to compare the first and second sums to detect the presence of speech in the near-audio received, the control module determines whether a difference between the first and second sums is at least greater than a threshold.

29. The unit of claim 28, wherein the first range comprises a mid-band range of frequencies, wherein the second range comprises an outer-band range of frequencies outside the mid-band range, and wherein to detect the presence of speech, the control module indicates that speech is present if the difference of the first sum of the energies in the mid-band range less the second sum of energies in the outer-band range multiplied by a weighting factor is greater than the threshold.

30. The unit of claim 28, wherein a value of the threshold depends on an indication that far-end audio is present in the near-end audio received.

31. The unit of claim 30, wherein the threshold has a lower value if substantially only near-end audio is indicated as being present in the near-end audio received and has a higher value if far-end audio is indicated as being present in the near-end audio received.

* * * * *